United States Patent

Sienerth et al.

[19]

[11] Patent Number: 6,089,283
[45] Date of Patent: Jul. 18, 2000

[54] METHOD OF FILLING CONTAINERS

[75] Inventors: Richard P. Sienerth, Erie; John E. Zarycki, North East; Michael J. Melaragno, Erie, all of Pa.

[73] Assignee: Renold, Inc., Westfield, N.Y.

[21] Appl. No.: 09/211,569

[22] Filed: Dec. 15, 1998

Related U.S. Application Data

[63] Continuation-in-part of application No. 08/994,226, Dec. 19, 1997, Pat. No. 5,975,155.

[51] Int. Cl.[7] ................................................ B65B 1/00
[52] U.S. Cl. .......................... 141/75; 141/1; 141/7; 141/12; 141/73; 141/83; 141/84; 141/166; 141/284; 141/314
[58] Field of Search ................................ 141/1, 5, 7, 10, 141/12, 71–76, 80, 83, 84, 165, 166, 181, 182, 284, 287, 313–317, 383

[56] References Cited

U.S. PATENT DOCUMENTS

| | | | |
|---|---|---|---|
| 4,804,550 | 2/1989 | Bradlsey et al. | 141/12 |
| 4,825,913 | 5/1989 | Stott | 141/287 |
| 5,259,425 | 11/1993 | Johnson et al. | 141/12 |

*Primary Examiner*—J. Casimer Jacyna
*Attorney, Agent, or Firm*—Lovercheck and Lovercheck

[57] ABSTRACT

A method of filling containers with bulk material wherein a bag is filled, weighed and densified at the same time. The bag is supported on a releasable hanger. The bag is constantly weighed, and a predetermined quantity of material is placed in the bag. The bag is raised and lowered and vibrated to settle, or densify, the material while the material is being admitted to the bag. The bag may be vibrated while being filled by counter-rotating vibrators. The material is weighed and the net weight is determined. The method of the present invention can be used for filling drums, boxes and other containers, as well as bags. Specific designed power operated hooks are used to support the bag. The containers are supported on a platform. Drums as well as bags can be filled without any change in the machine requiring tools. A three piece spout is used to fill bags and a drum head adapter is supported on the spout to fill drums.

24 Claims, 10 Drawing Sheets

METHOD OF FILLING CONTAINERS

This is a Continuation-In-Part of application filed on Dec. 19, 1997, and assigned Ser. No. 08/994,226 for a bag filler now U.S. Pat. No. 5,975,155.

BACKGROUND OF THE INVENTION

This invention relates generally to a method of filling machines and more particularly to a filling machine that will fill either bags, boxes, drums or tote bins without any change or adjustment of the filling machine that requires the use of tools.

Applicant is aware of the following prior art U.S. Pat. Nos. DES 251,249; DES 315,627; DES 346,253; 4,519,426; 4,676,284; 4,688,371; 4,703,782; 4,863,065; 4,964,782; 5,033,935; 5,036,893; 5,269,579; and, 5,564,264.

SUMMARY OF THE INVENTION

The machine has several major features that are: A drum head filling/sealing mechanism to allow fill stations the flexibility to fill bags, boxes, drums or tote bins as well as bags without requiring tools for a change over by providing a drum head adapter. It also allows the creation of a dust tight filling zone at the container. This is achieved by sliding the drum head adapter over the inflatable neck seal on the fill spout which creates a dust tight seal between the inside diameter of the adapter and the outer edge of an inflatable neck seal on the fill spout. This feature coupled with the three-piece spout design that has a flexible section, and a pair of actuators allows the creation of the seal to the top of the drum. This mechanism as described also allows the filling of multiple size drums with varying heights and varying diameters.

Figure 20:
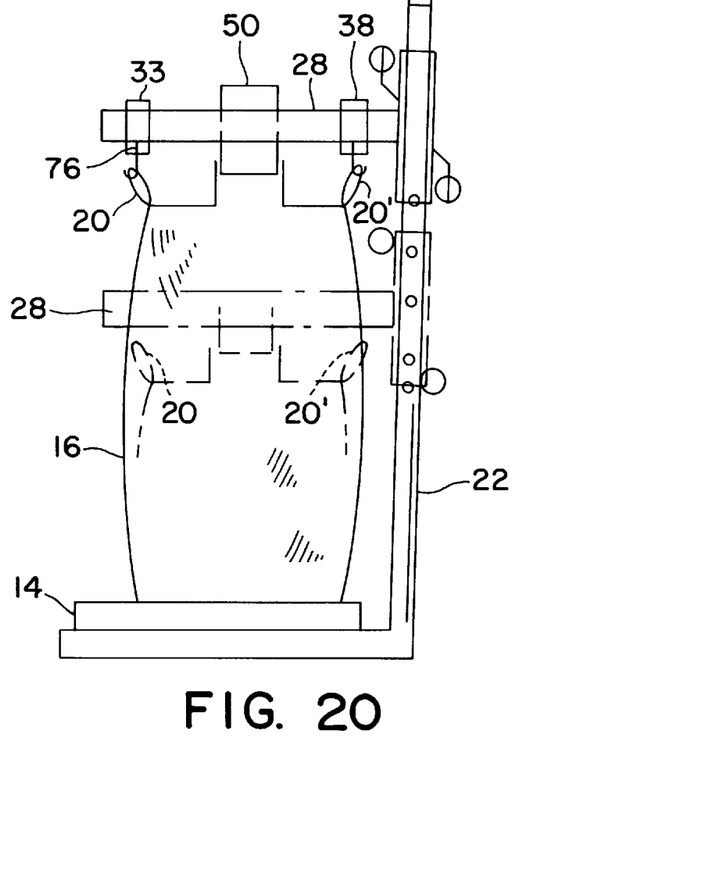
FIG. 20 is a side view showing two sizes of bags supported on the bag support arms.
Figure 21:
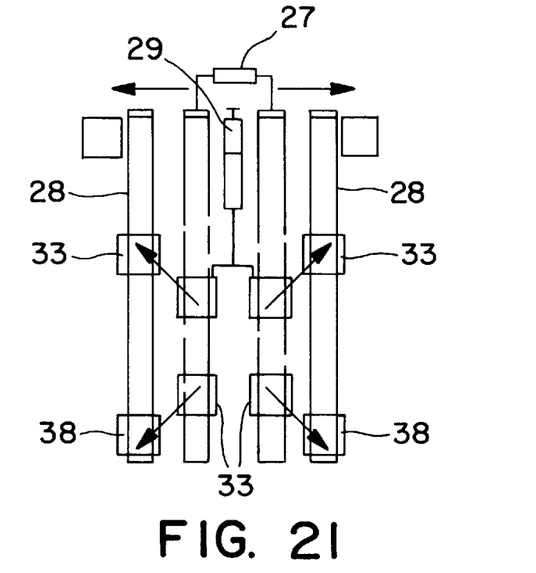
FIG. 21 is a diagrammatic top view of the bag support and arms shown in several positions.

An automatic bag release mechanism allows automatic release of the hanging stirrups of a full or partially full bag. This device uses an individual actuator on each assembly to create the motion required to pull the hook backwards and release the bag stirrup. The system incorporates the use of four of these individual assemblies. The use of the assemblies coupled with applicant's custom designed adjustable arms allows for adjustment within the confines of the overall system constraint, giving the user maximum adjustability for varying bag sizes as shown in FIG. 20. The assemblies also have lock down knobs, which allow for the assemblies to be fixed after adjustment.

The hook has been specially designed to allow for maximum holding area while having specially designed curves that allow for the release of the bag stirrup, under load.

Rear to front traversing hooks allow for the rear bag hanging assemblies (consisting of the hook, release actuator and housing) to move forward. This serves two purposes: (a) The operator no longer has to step on the machine to hang the rear bag stirrups on the assembly which creates a much safer working atmosphere; and, (b) improves the efficiency of the fill process. This is accomplished by modifying the standard hook assembly and, attaching an actuator. This actuator is mounted above the mechanism with mounting brackets being located on each end.

Sequence of operation—The machine incorporates a unique sequence. This is that during the fill cycle, the bag is lifted and lowered while filling to vibrate it. This creates a superior package at the end of the fill cycle. The number of lifts and lowers varies depending on product and process. The lifting is accomplished by using a single lifting device located in the rear of the machine. This lifting mechanism serves two purposes: (a) allows the system to function as explained above; and, (b) gives the system another adjustment necessary for the system to fill multiple containers, see FIG. 20.

Two important features in the machine sequence are: (1) the raising and lowering of a bulk bag while it is being filled; and, (2) densification while the bulk bag is being filled. The combination of dynamics provided by both the bag frame and the vibratory table deck moves the product into voids present in either the bag, or voids within the material itself. Bulk bags may be used that are constructed of woven flexible material. Due to the nature of the bag's ability to stretch, it is important to insure uniform stretching around the entire perimeter of the bulk bag from the bottom to the top as target weight is achieved. Stretching also occurs in the vertical plane between the stirrups and the load pulling downward. If vibration was to continue throughout the entire sequence and the flow of material within the filling spout is off center, the bag would tend to fill and take a shape unsymmetrical about its centroid. If the bulk bag is allowed to be filled without either dynamic intervention, it is also possible to have a greater product load present unsymmetrically about the centroid of the bulk bag radius, with respect to the centerline of the filling spout. When the filled bag is moved, the unbalanced weight favoring that cross-sectional area of the product will over power the remaining product and cause the bulk bag to lean in that direction. This is caused by an uneven metering of flow from the storage hopper and through the filling spout.

Figure 22:
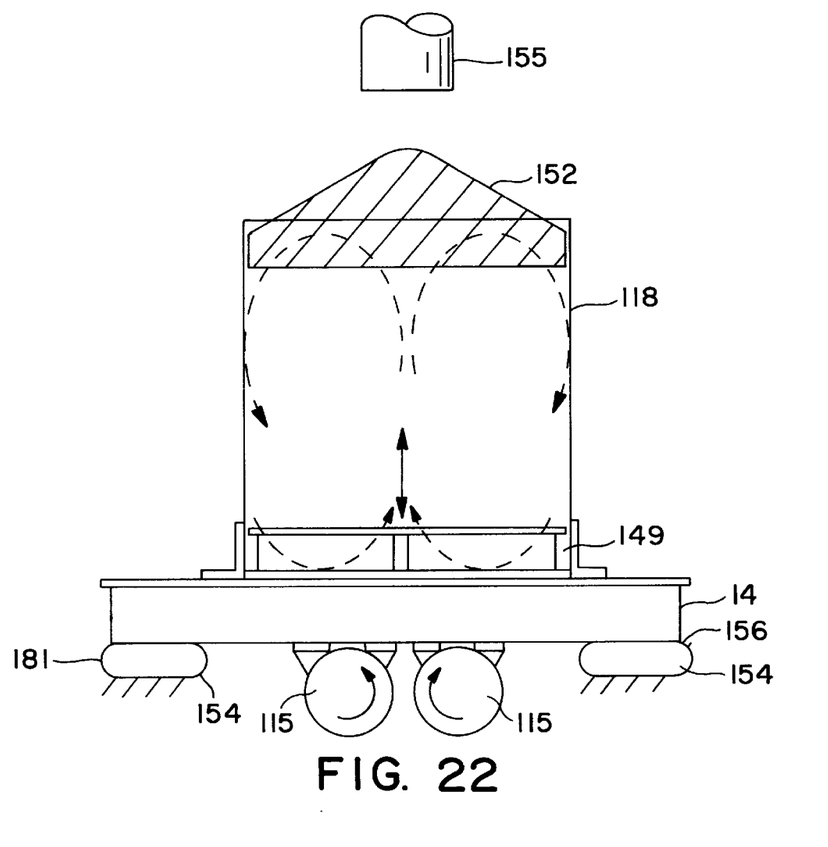
FIG. 22 is a diagrammatic cross-sectional side view of a drum supported on a vibrating table showing the pneumatic isolators and counter-rotating vibrators.
Figure 23:
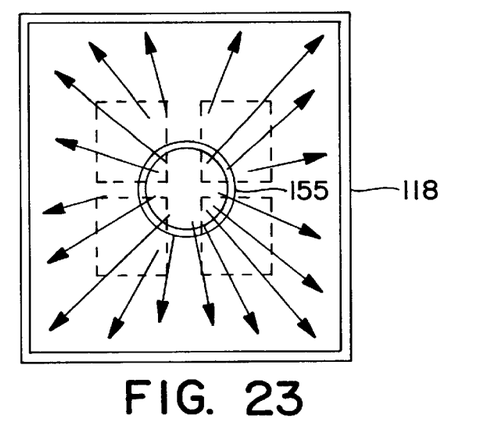
FIG. 23 is a diagrammatic top view of the container cover showing the flow of material during densification.

Both features (bag lifting; lowering; and vibration) produce, the optimum method of properly filling bulk bags. However, it is possible to eliminate the vibratory sequence for certain free flowing products that are granular, cubic, spherical and dry. The vibratory motion conditions the product making it dynamic about the center of rectilinear motion. FIGS. 22 and 23 show a drum supported on air filled isolators. It also shows counter-rotating weight vibrators. The flow rate upwards is greater at the centerline and slower about the corners of the bulk bag. The proper selection of frequency (RPM); and force output of the vibrators will make the flow of product move close together. Too great force output will cause the product to aerate, the product will travel farther apart dynamically diminishing the possibility of maximizing densification. When product travels closer together, maximum densification occurs. When the G-level is greater than 2.0, relative to force output of the vibrators and proper frequency selected, maximum densification occurs in less than 15 seconds from the time of initiation. When there is an unsymmetrical load present within the bulk bag and the bag frame is lifted, the product load will pull downward causing the product to move and seek a balance about the four hanging points of the bag. If an abundance of product is favoring one particular side of the bag (such as a hump), the vibration cycle in the next step will condition the product and even it out. When wet or sticky products are introduced to this sequence having a natural angle of repose greater than fifteen degrees, a final vibration cycle may be introduced to eliminate it.

A dual pressure solenoid system of a type familiar to those skilled in the art is used for isolating. The vibratory tables are used for vibration and, since it requires different air pressure to properly inflate the air mounts under different loading conditions, the dual pressure solenoid system is used.

This system utilizes solenoids and valves ported in such a way that the system of a type familiar to those skilled in the art that is able to change the pneumatic or hydraulic pressure needed to properly suspend the load. This allows the flexibility to accommodate densifying containers with significantly different target weights.

The sequence of operation can be either automatic or manual.

The machine may have a sequence circuit which may be controlled by push button switches. An automatic circuit will have an automatically activated switch to control the components of the machine in accordance with pneumatic control practice familiar to those skilled in the art.

It is an object of the present invention to provide an improved method of filling bags and drums without alteration of the filling machine that require tools.

Another object of the present invention is to provide a method that is simple, economical and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DESCRIPTION OF THE PREFERRED EMBODIMENT(S)

Now with more particular reference to the drawings, machine 10 has fixed frame 11, movable deck 12, and deck 14.

Fixed frame 11 has vertically extending posts 22 and telescopically slidable vertical members 24 slidably supported on posts 22. Posts 22 are connected together by cross member 26. Deck 14, on which bag 16 or drum 18 can rest. Vibrator 15 is attached to deck 14.

Bag 16 has a spouted top, sides and a closed bottom. After bag 16 is supported on bag hooks 75, spout 50 is slipped over cuff 60 then bag 16 is weighed using scale 13.

Compressed air connection 17 is connected to a suitable source of compressed air for inflating bladder 61 of cuff 60.

Junction box 19 contains the wiring and pneumatic connections.

Front stirrups 20 and rear stirrups 20' are fixed at spaced positions around the open end of bag 16. Rear stirrups 20' can be moved toward and away from front stirrups 20 by means of pneumatic traverse cylinder 29. Bag hooks 75 are supported on arms 28 by slide tubes 33. Bag 16, which is supported on a support means in the form of bag hooks 75, can be raised up and down by means of pneumatic cylinder 30 which raises and lowers arms 28 and bag hooks 75 to raise and lower bag 16. Arms 28 may be moved toward and from each other by sliding on guide arm frame 29 and clamping to accommodate a wide range of different container sizes.

Panel 21 has push buttons for controlling valves and switches, pneumatic cylinder 30, spout 50, cuff 60, hook cylinders 78 and other switches and valves.

Container cover 44 is attached to sliding drum head adapter 52. Drum head adapter 52 has handles 51 for ease in manually moving drum head adapter 52. Drum head adapter 52 surrounds, seals and is held by inflatable cuff 60. Drum head adapter 52 is received on outer cylinder 55. Air is supplied to bladder 61 through air fitting 17 connected to a control valve.

In operation, the bulk material to be bagged is delivered to machine 10 through building ductwork and is connected to inner cylinder 66 of three-piece spout 50. Three-piece spout 50 is made up of outer cylinder 55, intermediate cylinder 58, and inner cylinder 66 telescopically supported on each other. Outer cylinder 55 has flange 53 connected to piston rods 63, of air cylinders 64, by attaching lugs 48. Air cylinders 64 are carried by cover support frame 46. Intermediate cylinder 58 has flange 59 attached to cover support frame 46. Inner cylinder 66 has flange 67.

Figure 1:
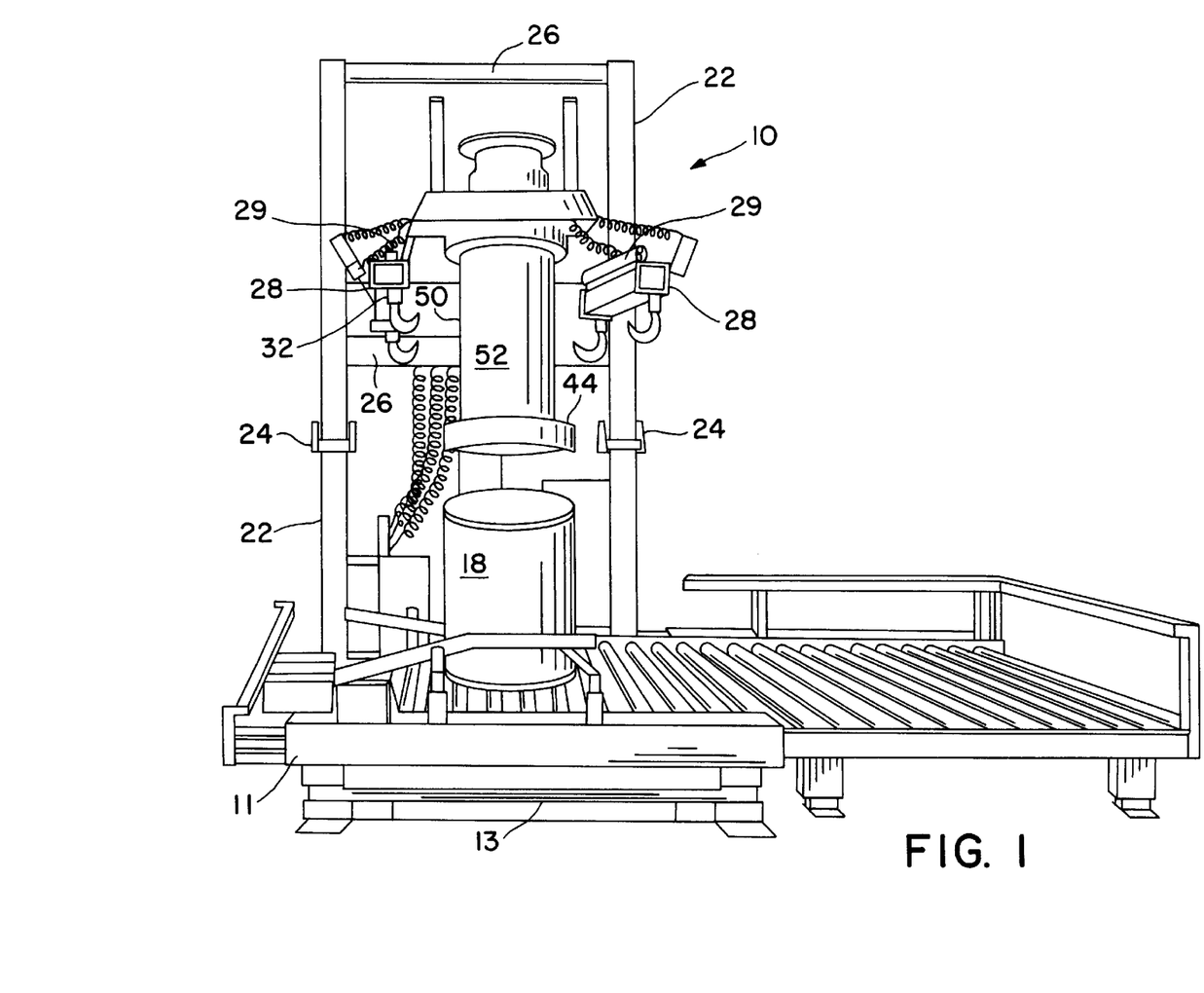
FIG. 1 shows a front isometric view of the machine with a drum in position for filling in accordance with the invention.
Figure 2:
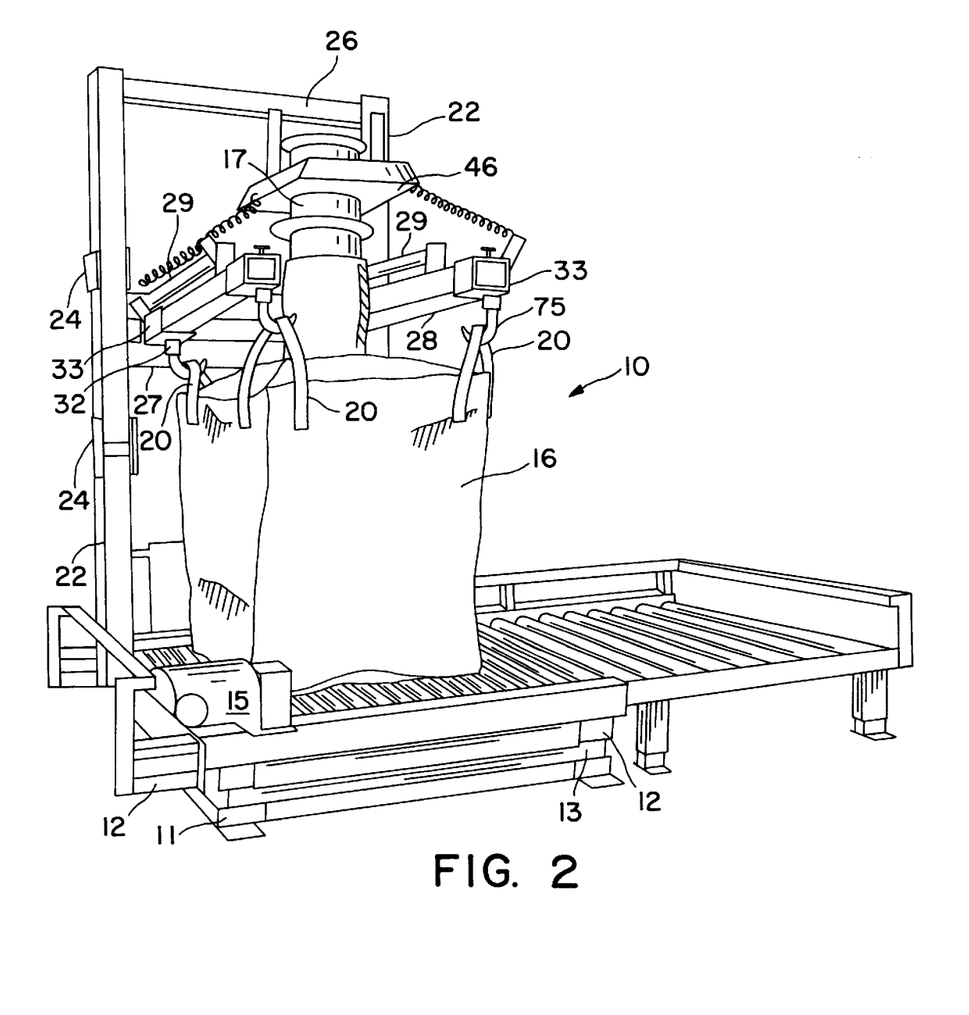
FIG. 2 shows a front view of a machine like the machine shown in FIG. 1, with a bag in position for filling.
Figure 3:
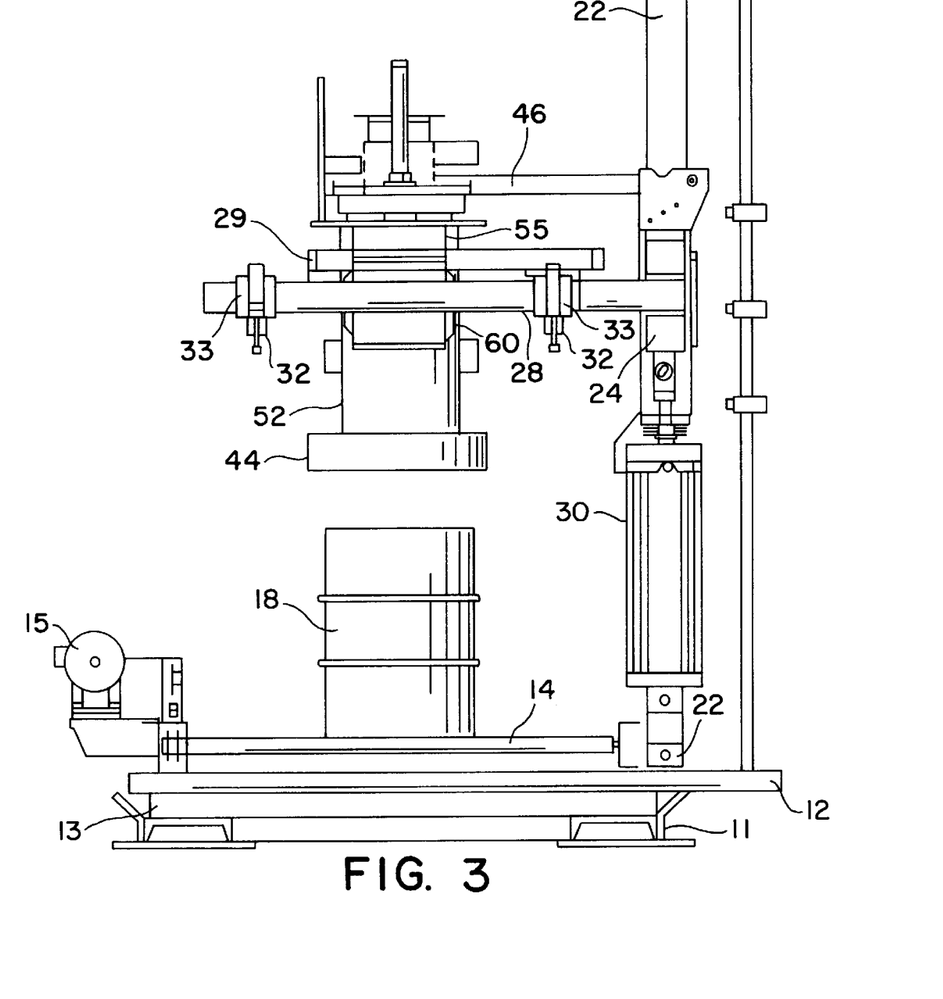
FIG. 3 is a side view of a machine like the machine shown in FIG. 1 with a drum in position for filling in accordance with the invention.
Figure 3A:
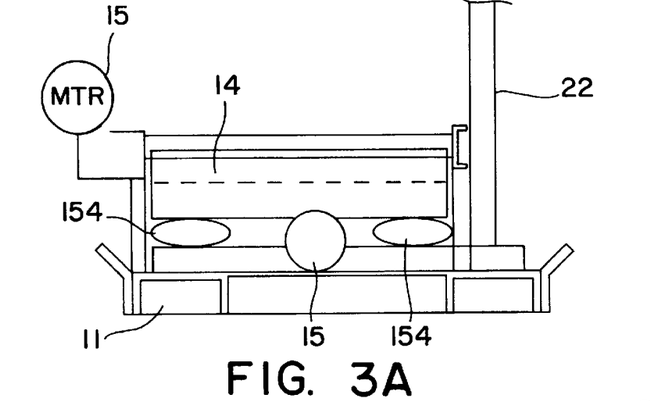
FIG. 3A is an end view of a machine having a vibratory deck.
Figure 4:
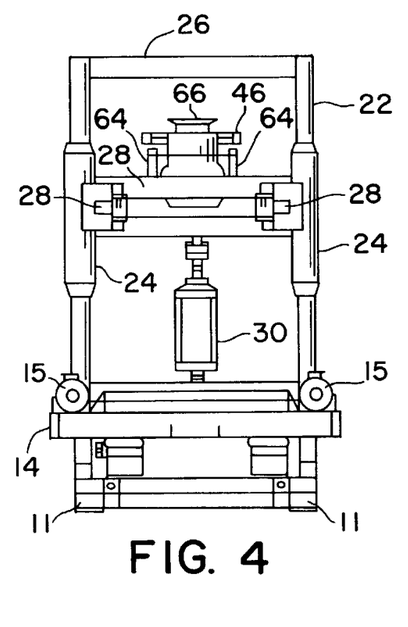
FIG. 4 is a front view of a machine like the machine shown in FIGS. 1–3.
Figure 5:
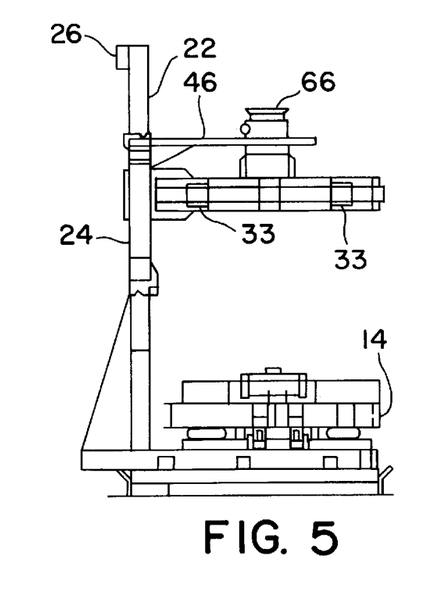
FIG. 5 is a side view of a machine like the machine shown in FIGS. 1–4.
Figure 6:
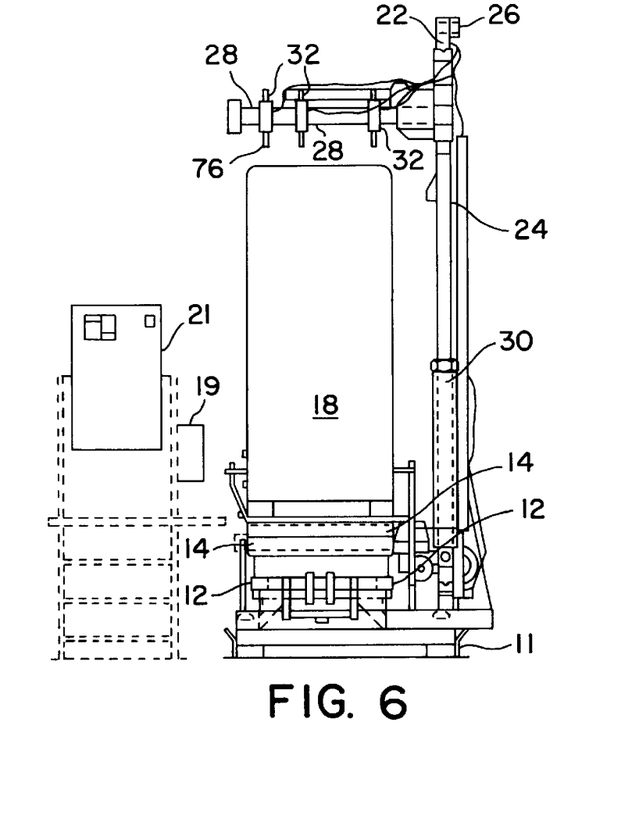
FIG. 6 is a side view of the machine showing the bag support arms, support members, drum support neck, fixed frame, conveyor and control panel.
Figures 7, 8, 10:
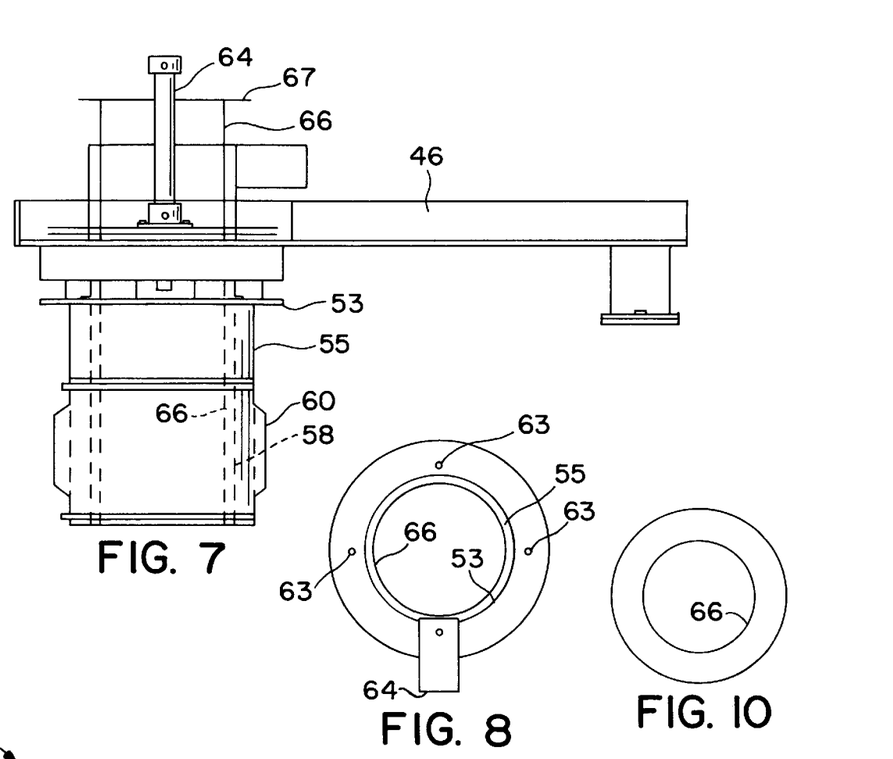
FIG. 7 is a side view of the three-piece spout and spout support frame.
FIG. 8 is a top view of the outer cylinder of the three-piece spout.
FIG. 10 is a top view of the inner cylinder of the three-piece spout.
Figures 7A, 9:
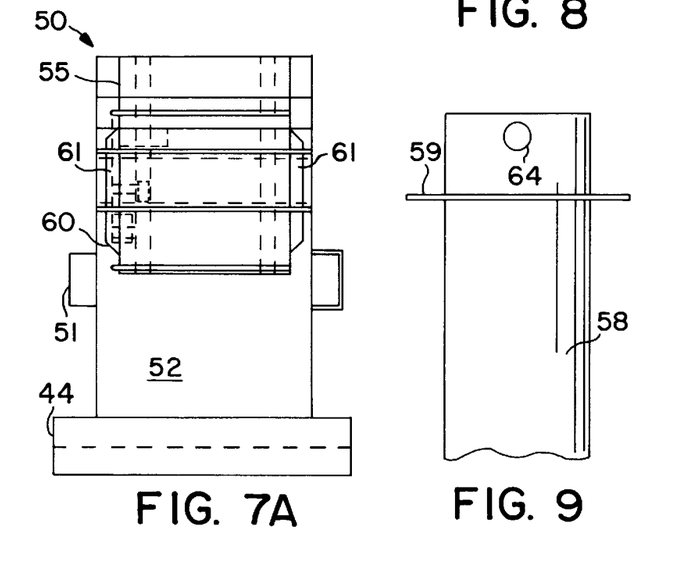
FIG. 7A is a front view of the drum head adapter and outer cylinder.
FIG. 9 is a side view of the intermediate cylinder of the three-piece spout.
Figure 11:
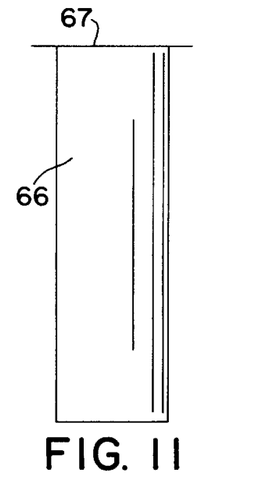
FIG. 11 is a side view of the inner cylinder of the three-piece spout.
Figure 12:
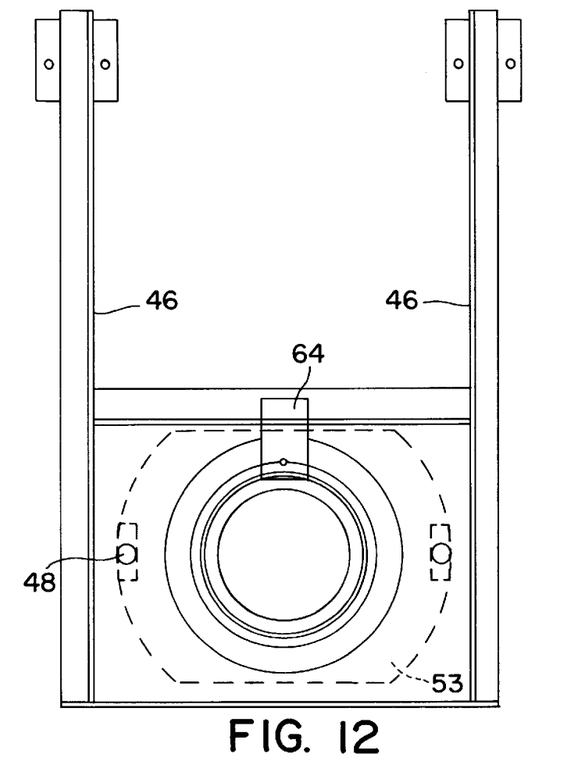
FIG. 12 is a top view of the three-piece spout and spout supporting frame.
Figures 13, 16:
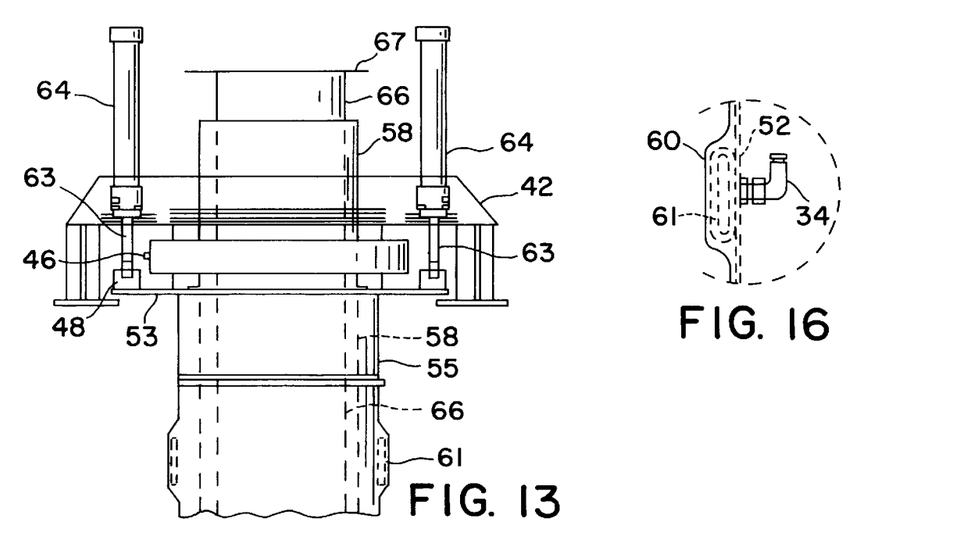
FIG. 13 is a front view of the three-piece spout and spout support frame.
FIG. 16 is a partial enlarged sectional view of the inflatable seal on the outer cylinder.
Figure 14:
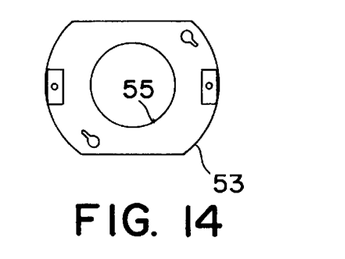
FIG. 14 is a top view of the flange and outer cylinder of the three-piece spout.
Figure 15:
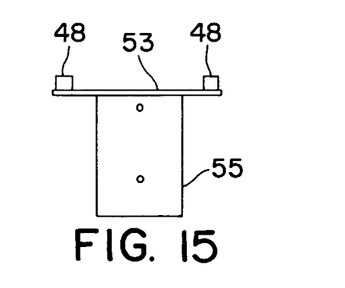
FIG. 15 is a front view of the outer cylinder and flange shown in FIG. 14.
Figure 17:
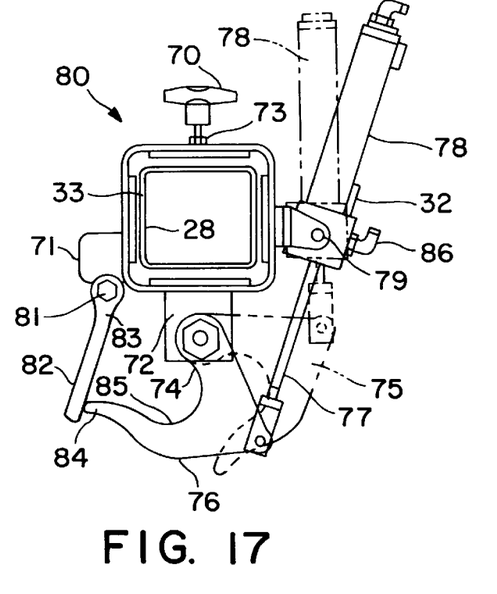
FIG. 17 is an enlarged front view of a bag support member.
Figure 18:
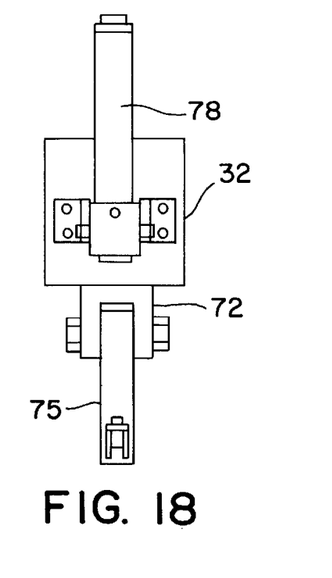
FIG. 18 is an enlarged side view of the bag support member shown in FIG. 16.
Figure 19:
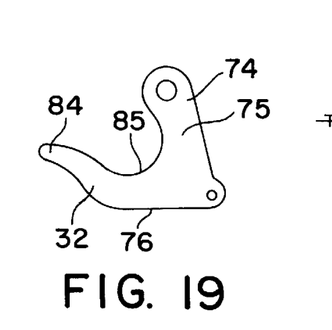
FIG. 19 is a side view of the bag support hook according to the invention.
Figure 19A:
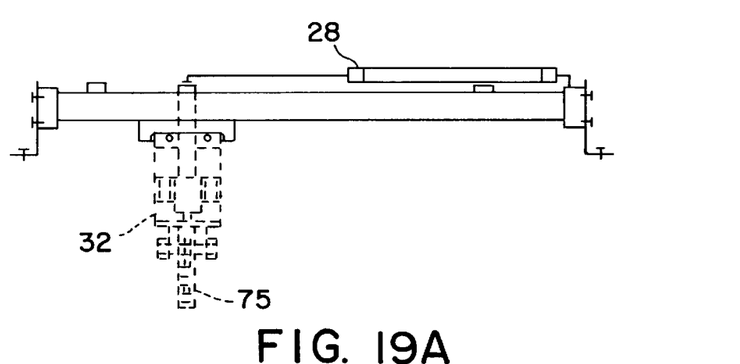
FIG. 19A is a side view of the moving means for the bag support.

Hook assembly 80 is shown in FIGS. 17, 18 and 19. Stirrups 20 of bag 16 are received on hooks 75. Each slide tube 33 is slidably supported on arm 28. Each slide tube 33 has one of lugs 71,72,74 fixed thereto. End 74 of each hook 75 is pivotally attached to second lug 72. Knobs 73 lock the slide tubes 33 to arms 28. Bottom 76 of hook 75 is pivoted to hook piston rod 77. Hook piston rod 77 is received in hook cylinder 78. Hook cylinder 78 can be operated by compressed air or other suitable fluid or gas connected to fitting 86. Keeper 82 is pivoted to first lug 71 at position 81. Spring 83 urges keeper 82 toward hook point 84. Hook 75 will be in the full line position, shown in FIG. 17, when bag 16 is in the loading position, shown in FIG. 2, engaging keeper 82 and hook 75 in front/rear stirrups 20/20'. When hook 75 is pulled to the unloaded position, shown in phantom lines in FIG. 17, top surface 85 of hook 75 is disposed substantially vertically so that stirrup 20 will slip off hook 75. Keeper 82 helps retain front/rear stirrups 20/20' on hook 75 during the bag loading procedure.

In the illustration shown in FIGS. 22 and 23, when vibrators 115 are operating the bulk material follows a path indicated by the arrows.

Empty open top container 118 is moved into a position under sliding fill head adapter 152. Fill head adapter 152 is lowered into top of drum 18. Material is conducted through cylinder 155 and fill head adapter 152 into container 118.

Figure 24:
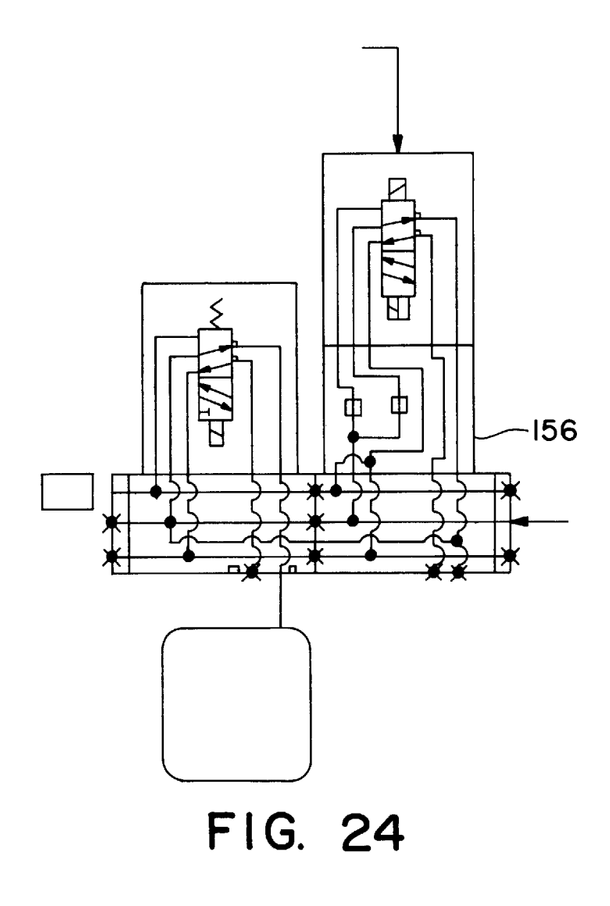
FIG. 24 is a schematic diagram of a fluid circuit for selectively connecting a first fluid pressure and a second fluid pressure to the isolators.
Figure 25:
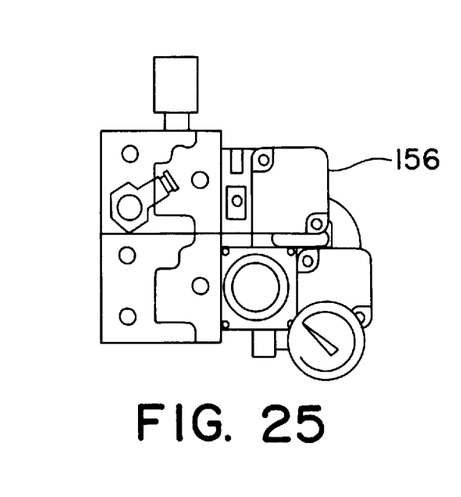
FIG. 25 is an end view of a valve for connecting the circuit shown in FIG. 24.
Figure 26:
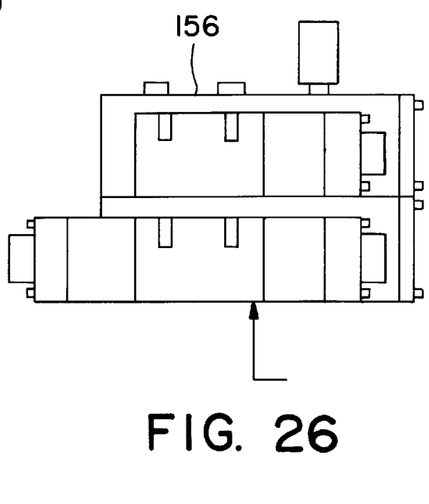
FIG. 26 is a side view of the valve shown in FIG. 25.

A solenoid-operated valve familiar to those skilled in the art, shown in FIGS. 24, 25 and 26, can be used to admit air through valves 156 to air-filled isolators 154. When the weight of material in container 118 reaches a predetermined amount the pressure to isolators 154 is changed, depending on the weight of material to be added to container 118. Container 118 may be vibrated by counter-rotating vibrators 115 that are fixed to the bottom of deck 14. Pallet 149 rests on deck 14. Deck 14 is supported on isolators 154.

The foregoing specification sets forth the invention in its preferred, practical forms but the structure shown is capable of modification within a range of equivalents without departing from the invention which is to be understood is broadly novel as is commensurate with the appended claims.

What is claimed is:

1. A method of filling a container comprising the steps of:
   a) supporting said container;
   b) dispensing bulk material into said top of said container; and,
   c) lifting and lowering and vibrating said container while dispensing to densify said bulk material.

2. The method of claim 1 further comprising dispensing said bulk material into said container to a predetermined portion of target weight; and,
   vibrating said container;
   lifting said container; and,
   lowering said container.

3. The method of claim 1 comprising the further steps of:
   vibrating said container after introducing said material into said container;
   adding additional material to said container; and,
   lifting, lowering and vibrating said container while adding said additional material.

4. The method of claim 1 comprising weighing said bag before filling thereby providing a tare weight.

5. The method of claim 1 further comprising inflating said bag to full size before introducing said material into said bag.

6. The method of claim 1 further comprising providing two spaced front support means and two spaced rear support means spaced rearwardly from said front support means;
   moving said rear support means toward said front support means for convenient access;
   supporting said sides of said bag adjacent said open top of said bag on said front support means and on said rear support means;
   moving said rear support means rearwardly from said front support means before dispensing said material into said bag.

7. The method of claim 1 further comprising filling said container to 75% target weight and weighing said container.

8. The method recited in claim 1 wherein said vibrating is done by a counter-rotating vibrator having two rotors rotating in opposite directions to each other.

9. The method of claim 8 wherein said vibrators have a G-level of greater than 2.0 relative to the force output of the vibrator and the total weight of the supporting deck and load combined.

10. The method of claim 1 further comprising the steps of:
    dispensing said bulk material into said container to about 50% target weight;
    vibrating, lifting and lowering said container,
    dispensing said bulk material into said container to about 75% target weight;
    vibrating, lifting and lowering said container;
    dispensing said bulk material into said container to target weight; and,
    vibrating, lifting and lowering said container.

11. A method of filling bags, boxes and drums on the same machine without requiring tools for changing comprising the steps of:
    providing a hollow generally cylindrical fill spout connected to said machine for dispensing bulk material;
    supporting an open top bag on said machine with an inflatable cuff on the end thereof;
    inserting an end of said spout into said open top and filling said bag;
    lifting, lowering and vibrating said bag;
    removing said bag from said machine;
    disposing a cylindrical drum head adapter over said spout;
    inflating said cuff thereby holding said drum head adapter over said spout;
    supporting said drum head adapter on a drum;
    filling said drum through said spout; and,
    lifting, lowering and vibrating said drum.

12. The method of claim 11 further comprising supporting said bag on fluid filled isolators containing fluid under pressure;
    increasing said pneumatic pressure in said isolators when said bag contains a predetermined weight of product and continuing to fill said bag.

13. The method of claim 12 further providing said bag with stirrups attached to said sides of said bag; and,
    supporting said bag on said machine by said stirrups while filling said bag.

14. The method recited in claim 13 further comprising increasing said pressure in said isolators when said bag reaches a predetermined part of said target weight.

15. A method of filling bags having sides and an open top, and a top edge comprising;

providing two front support means and two rear support means;

moving said rear support means toward said front support means;

supporting said sides by said two front support means and said two rear support means;

inserting a spout into said bag;

sealing said bag to said spout;

moving said spout and said two rear support means rearward away from said front support means;

inflating said bag thereby removing wrinkles;

exhausting air from said bag thereby removing dust;

dispensing bulk material into said bag;

raising and lowering said bag thereby densifying said material; and releasing said bag support means.

16. The method of claim 15 further comprising vibrating said bag while dispensing said material.

17. The method of claim 15 further comprising vibrating said bag with a vibrator having counter-rotating weights.

18. The method of claim 17 wherein said vibrator has a G-level of greater than two relative to its force output.

19. The method of claim 15 further comprising simultaneously releasing said bag from said front support means and from said rear support means.

20. The method of claim 15 further comprising weighing said bag during the entire filling process.

21. A method of filling a container comprising the steps of:

supporting said container;

dispensing bulk material into said top of said container;

lifting, lowering and vibrating said container while dispensing to densify said bulk material;

adding additional material to said container; and, lifting lowering and vibrating said container while adding said additional material.

22. The method of claim 21 comprising the further step of filling said container to approximately 50% target weight; and, lifting, lowering and vibrating said container.

23. The method of claim 22 comprising the further steps of:

filling said container to approximately 75% target weight; and, lifting, lowering and vibrating said container.

24. The method of claim 23 comprising the further steps of:

filling said container to approximately 100% target weight; and, lifting, lowering and vibrating said container.

\* \* \* \* \*